United States Patent
Yamada et al.

(10) Patent No.: US 7,401,018 B2
(45) Date of Patent: Jul. 15, 2008

(54) FOREIGN LANGUAGE LEARNING APPARATUS, FOREIGN LANGUAGE LEARNING METHOD, AND MEDIUM

(75) Inventors: Reiko Yamada, Kyoto (JP); Takahiro Adachi, Kyoto (JP); Konstantin Markov, Kyoto (JP); Shigeru Katagiri, Kyoto (JP); Eric McDermott, Kyoto (JP)

(73) Assignee: Advanced Telecommunications Research Institute International, Kyoto (JP)

( * ) Notice: Subject to any disclaimer, the term of this patent is extended or adjusted under 35 U.S.C. 154(b) by 402 days.

(21) Appl. No.: 09/936,365

(22) PCT Filed: Dec. 11, 2000

(86) PCT No.: PCT/JP00/08762

§ 371 (c)(1),
(2), (4) Date: Sep. 13, 2001

(87) PCT Pub. No.: WO01/52237

PCT Pub. Date: Jul. 19, 2001

(65) Prior Publication Data

US 2002/0160341 A1    Oct. 31, 2002

(30) Foreign Application Priority Data

Jan. 14, 2000 (JP) .......................... 2000-006696
Mar. 21, 2000 (JP) .......................... 2000-078578

(51) Int. Cl.
*G10L 15/22* (2006.01)
*G09B 19/04* (2006.01)

(52) U.S. Cl. .................. 704/251; 704/270; 434/185
(58) Field of Classification Search ............... 704/2, 704/5, 8, 270.1, 1, 7, 9, 10, 277, 252, 256, 704/185, 251, 253, 270; 434/185, 156
See application file for complete search history.

(56) References Cited

U.S. PATENT DOCUMENTS 5,487,671 A    1/1996   Shpiro et al.

(Continued)

FOREIGN PATENT DOCUMENTS

JP    1-156800    6/1989

(Continued)

OTHER PUBLICATIONS

R. Yamada et al., "Second language production training using spectrographic representations as feedback", The Journal of Acoustical Society of Japan (E), vol. 18, No. 6, Nov. 1997, pp. 341-344.

(Continued)

*Primary Examiner*—Martin Lerner
(74) *Attorney, Agent, or Firm*—McDermott Will & Emery LLP

(57) ABSTRACT

A speech recognition unit (114) and a processor unit (116) of a foreign language learning device (100) receive sentence speech information corresponding to a sentence pronounced by a learner (2) to separate the information into word speech information on the basis of words included in the sentence. The processor unit (116) evaluates the degree of matching (likelihood) of each word speech information with a model speech, and a resultant evaluation is indicated on a display unit (120) on the basis of each word.

22 Claims, 16 Drawing Sheets

U.S. PATENT DOCUMENTS

| | | | |
|---|---|---|---|
| 5,634,086 A * | 5/1997 | Rtischev et al. | 704/270 |
| 6,006,175 A * | 12/1999 | Holzrichter | 704/208 |
| 6,029,131 A * | 2/2000 | Bruckert | 704/260 |
| 6,055,498 A * | 4/2000 | Neumeyer et al. | 704/246 |
| 6,064,957 A * | 5/2000 | Brandow et al. | 704/235 |
| 6,085,160 A * | 7/2000 | D'hoore et al. | 704/256.2 |
| 6,224,383 B1 * | 5/2001 | Shannon | 434/156 |
| 6,249,763 B1 * | 6/2001 | Minematsu | 704/252 |
| 6,438,524 B1 * | 8/2002 | Shi | 704/277 |
| 6,598,019 B1 * | 7/2003 | Tokuda et al. | 704/255 |
| 6,708,154 B2 * | 3/2004 | Acero | 704/260 |
| 6,735,559 B1 * | 5/2004 | Takazawa | 704/7 |
| 2004/0215445 A1 * | 10/2004 | Kojima | 704/9 |

FOREIGN PATENT DOCUMENTS

| | | |
|---|---|---|
| JP | 1-33831 | 7/1989 |
| JP | 1-173768 | 12/1989 |
| JP | 3-226785 | 10/1991 |
| JP | 5-165494 | 7/1993 |
| JP | 6-110494 | 4/1994 |
| JP | 9-259226 | 10/1997 |
| JP | 2757356 | 6/1998 |
| JP | 2834471 | 10/1998 |
| JP | 11-143346 | 5/1999 |
| JP | 11-202889 | 7/1999 |
| JP | 11-513144 | 11/1999 |
| JP | P3099845 | 8/2000 |
| JP | 2001-159865 | 6/2001 |
| WO | WO 94/20952 | 6/1994 |

OTHER PUBLICATIONS

T. Yamada et al., "Scientific Method for Improvement in English Speaking—Pronunciation Evaluated by Personal Computer", ATR Human Information Processing Research Laboratories, Aug. 20, 1999.

Method of Improving English Speaking in Scientific Manner (Phonology-Based, Uncut Version), Mar. 31, 2000.

H. Hamada et al., "Automatic Evaluation of English Pronunciation Spoken by Japanese", Mar. 24, 1989, pp. 9-14.

* cited by examiner

FOREIGN LANGUAGE LEARNING APPARATUS, FOREIGN LANGUAGE LEARNING METHOD, AND MEDIUM

TECHNICAL FIELD

The present invention relates to a device and a method for learning foreign languages by means of a speech recognition system and to a computer-readable medium recorded thereon a program for executing such a foreign language learning method by a computer.

BACKGROUND ART

In recent years, considerable attempts have been made to apply speech recognition systems to learning of foreign languages. Specifically, a learner uses a foreign language learning device to read out one or a plurality of sentences in a foreign language so that the pronounced sentence(s) is input to a personal computer (computing machine) through its voice input function. A speech recognition system incorporated in the personal computer adapted to that foreign language evaluates to what degree the sentence(s) read out by the learner can accurately be recognized and then a resultant rating is displayed as a feedback to the learner.

However, the speech recognition system used by the conventional foreign language learning device is originally devised with the objective of replacing keyboard input to the personal computer with voice input. Accordingly, sentences pronounced by the learner are recognized on the basis of one sentence and the recognized sentence and an original sentence are compared to output the result of comparison. Therefore, the learner can merely know a rating for the sentence evaluated as a whole.

In actual, it rarely occurs that the rating is the same for the entire sentence. Generally, a higher rating is achieved for a specific part of the sentence while a lower rating is given for another part.

Then, the learner cannot know, from the rating of the whole sentence, which part of the sentence is low in terms of the rating for pronunciation by the learner, particularly when the learner receives a low rating. Consequently, the learner repeatedly pronounces the entire sentence again and again until the rating rises, resulting in a problem that the learning efficiency is impaired.

DISCLOSURE OF THE INVENTION

One object of the present invention is to provide a foreign language learning device capable of presenting a rating for pronunciation of a sentence in a foreign language pronounced by a learner so as to enable the learner to efficiently practice the pronunciation of the foreign language.

Another object of the present invention is to provide a foreign language learning method by which a rating for pronunciation of a sentence in a foreign language pronounced by a learner can efficiently be fed back to the learner practicing the pronunciation of the foreign language.

Still another object of the invention is to provide a computer-readable medium recorded thereon a program for executing, by a computer, a foreign language learning method by which a rating for pronunciation of a sentence in a foreign language pronounced by a learner can efficiently be fed back to the learner practicing the pronunciation of the foreign language.

A foreign language learning device according to the present invention includes, for the purpose of achieving those objects, word separation means, likelihood determination means and display means. The word separation means receives sentence speech information corresponding to a sentence pronounced by a learner to separate the sentence speech information into word speech information on the basis of each word included in the sentence. The likelihood determination means evaluates degree of matching of each word speech information with a model speech. The display means displays, for each word, a resultant evaluation determined by the likelihood determination means.

Preferably, the foreign language learning device further includes storage means and output means. The storage means stores a model sentence to be pronounced by the learner and model phoneme array information corresponding to the model sentence. The output means presents the model sentence to the learner in advance. The word separation means includes phoneme recognition means and word speech recognition means. The phoneme recognition means recognizes the sentence speech information on the basis of each phoneme information. The word speech recognition means recognizes the word speech information for each word according to the phoneme information and the model phoneme array information after the separation.

According to another aspect of the invention, a foreign language learning method includes the steps of receiving sentence speech information corresponding to a sentence pronounced by a learner and accordingly separating the sentence speech information into word speech information on the basis of each word included in the sentence, evaluating degree of matching of each word speech information with a model speech, and displaying, for each word, a resultant evaluation of each word speech information.

Preferably, the foreign language learning method further includes the step of presenting a model sentence to the learner in advance. The step of separating the sentence speech information into the word speech information includes the steps of recognizing the sentence speech information on the basis of each phoneme information, and recognizing the word speech information for each word according to model phoneme array information corresponding to the model sentence presented to the learner and the phoneme information after the separation.

According to still another aspect of the invention, a foreign language learning device includes storage means, output means, word separation means, likelihood determination means, display means, and pronunciation evaluation means. The storage means stores a model sentence to be pronounced by a learner and model phoneme array information corresponding to the model sentence. Output means presents the model sentence to the learner in advance. The word separation means receives sentence speech information corresponding to a sentence pronounced by the learner to separate the sentence speech information into word speech information on the basis of each word included in the sentence. The likelihood determination means evaluates degree of matching of each word speech information with a model speech. The display means displays, for each phoneme and each word, a resultant evaluation by the likelihood determination means. The pronunciation evaluation means evaluates a resultant pronunciation after practice of the pronunciation for each phoneme and for each word in the model sentence uttered by the learner in a pronunciation practice period. The word separation means includes phoneme recognition means and word speech recognition means. The phoneme recognition means recognizes the sentence speech information on the basis of each phoneme information. The word speech recognition means recognizes the word speech information for each word according to the phoneme information and model phoneme array information after the separation.

According to a further aspect of the invention, a computer-readable medium recorded thereon a program for executing a foreign language learning method by a computer. The foreign language learning method includes the steps of receiving sentence speech information corresponding to a sentence pronounced by a learner and accordingly separating the sentence speech information into word speech information on the basis of each word included in the sentence, evaluating degree of matching of each word speech information with a model speech, and displaying, for each word, a resultant evaluation of each word speech information.

Accordingly, by the foreign language learning device or the foreign language learning method, a rating is shown for each word in a sentence pronounced by the learner. Then, the resultant rating for the pronunciation of the sentence in a foreign language uttered by the learner can efficiently be fed back to the learner practicing the pronunciation of the foreign language.

BEST MODES FOR CARRYING OUT THE INVENTION

Embodiments of the present invention are now described in conjunction with the drawings.

FIRST EMBODIMENT

Figure 1:
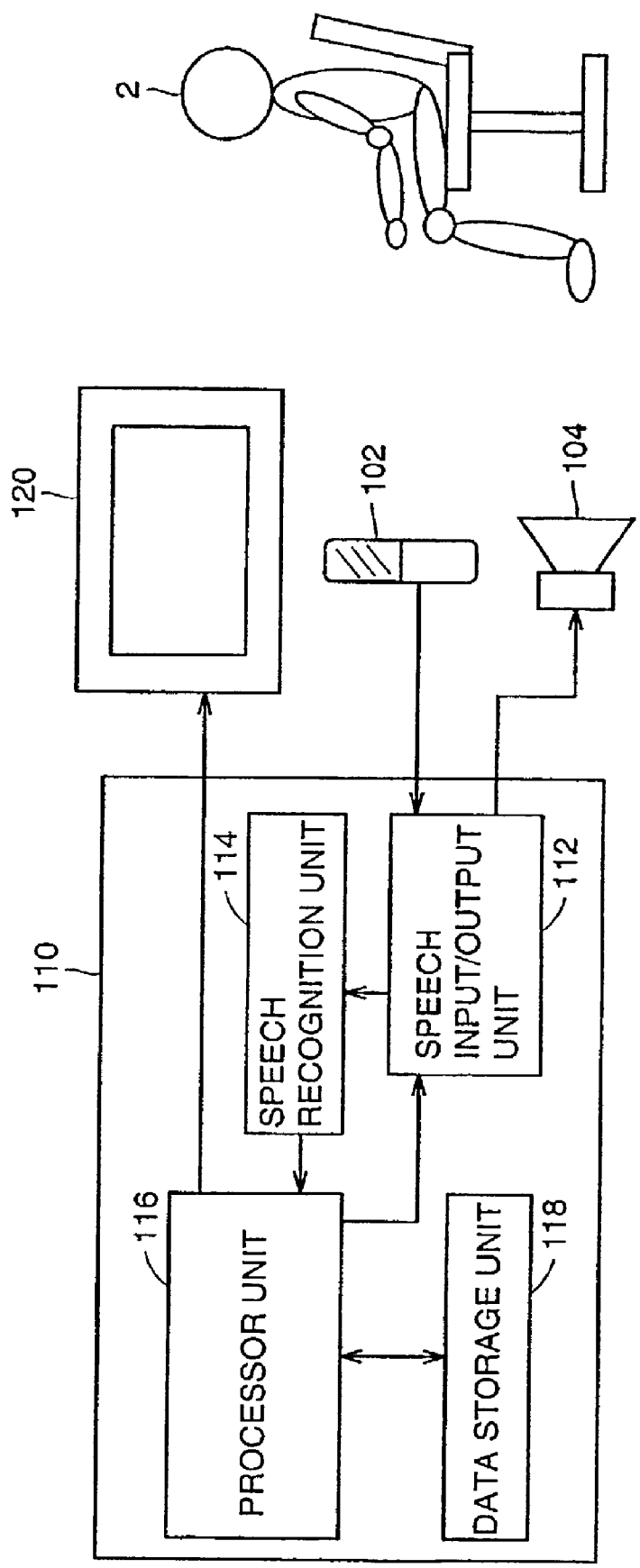
FIG. 1 is a schematic block diagram illustrating a structure of a foreign language learning device 100 according to the present invention.

FIG. 1 is a schematic block diagram illustrating a structure of a foreign language learning device 100 according to the present invention.

Although English language is herein used to describe a foreign language, use of the present invention is not limited to English and is applicable generally to any language to be learned by a learner that is not the native language of the learner, which will become clear from the following description.

Referring to FIG. 1, foreign language learning device 100 includes a microphone 102 for acquiring voice produced by a learner 2, a microcomputer 110 receiving an output of microphone 102 for processing voice information corresponding to a sentence pronounced by learner 2 to determine a rating for pronunciation by the learner for each word included in that sentence in accordance with an expected pronunciation, and a display unit (display) 120 for presenting an original sentence to be pronounced by learner 2 that is supplied from microcomputer 110 and displaying a rating for the learner's pronunciation of each word, the rating determined word by word.

The original sentence to be pronounced by learner 2 (hereinafter referred to as model sentence) may be presented as character information on display unit 120 to learner 2 or as sound from a loudspeaker 104 to learner 2. For practice of pronunciation of each word described below, a model pronunciation can be output as sound from loudspeaker 104.

Microcomputer 110 includes a speech input/output unit 112 serving as an interface for receiving a speech signal from microphone 102 and providing a speech signal to loudspeaker 104, a speech recognition unit 114 analyzing and separating, according to a signal from speech input/output unit 112, speech information corresponding to a sentence supplied to microphone 102 (hereinafter referred to as "sentence speech information") into phoneme information included in the sentence speech information as described below, a data storage unit 118 for temporarily storing the sentence speech information and holding the model sentence and phoneme information corresponding to the model sentence as well as information about word boundary, and a processor unit 116 determining, according to the result of separation by speech recognition unit 114 and the information about the model sentence which is held in data storage unit 118 and is provided to learner 2 for inducing the learner to pronounce the sentence, a rating for pronunciation by learner 2 on the basis of each word included in the model sentence, the rating determined relative to the phoneme information about the model sentence (model phoneme information).

Structure of Sentence Speech Information

Figure 2:
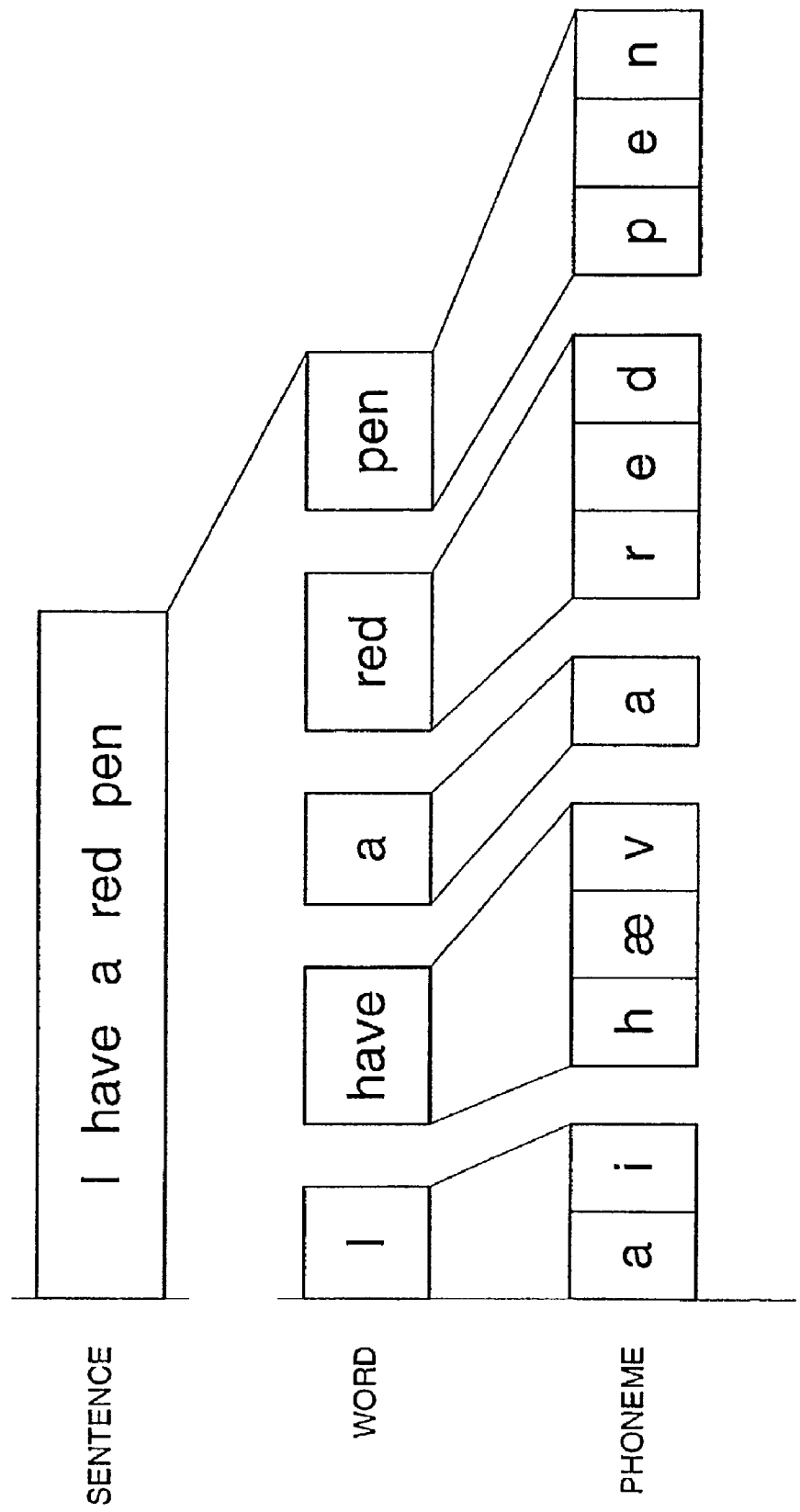
FIG. 2 is a conceptual representation illustrating a structure of sentence speech information on one of model sentences.

FIG. 2 is a conceptual representation illustrating a structure of sentence speech information about one of model sentences.

The example shown in FIG. 2 is a model sentence "I have a red pen."

The speech language has hierarchy as shown in FIG. 2. A sentence is segmented into words, then syllables (syllable is a unit consisting of consonant and vowel that is usually represented by one kana character in Japanese) and further into phonemes (single consonant, single vowel).

The process of segmenting one sentence is somewhat different between languages. For some languages, so-called "phrases" may be formed as an intermediate layer between the sentence and words.

Figure 3:
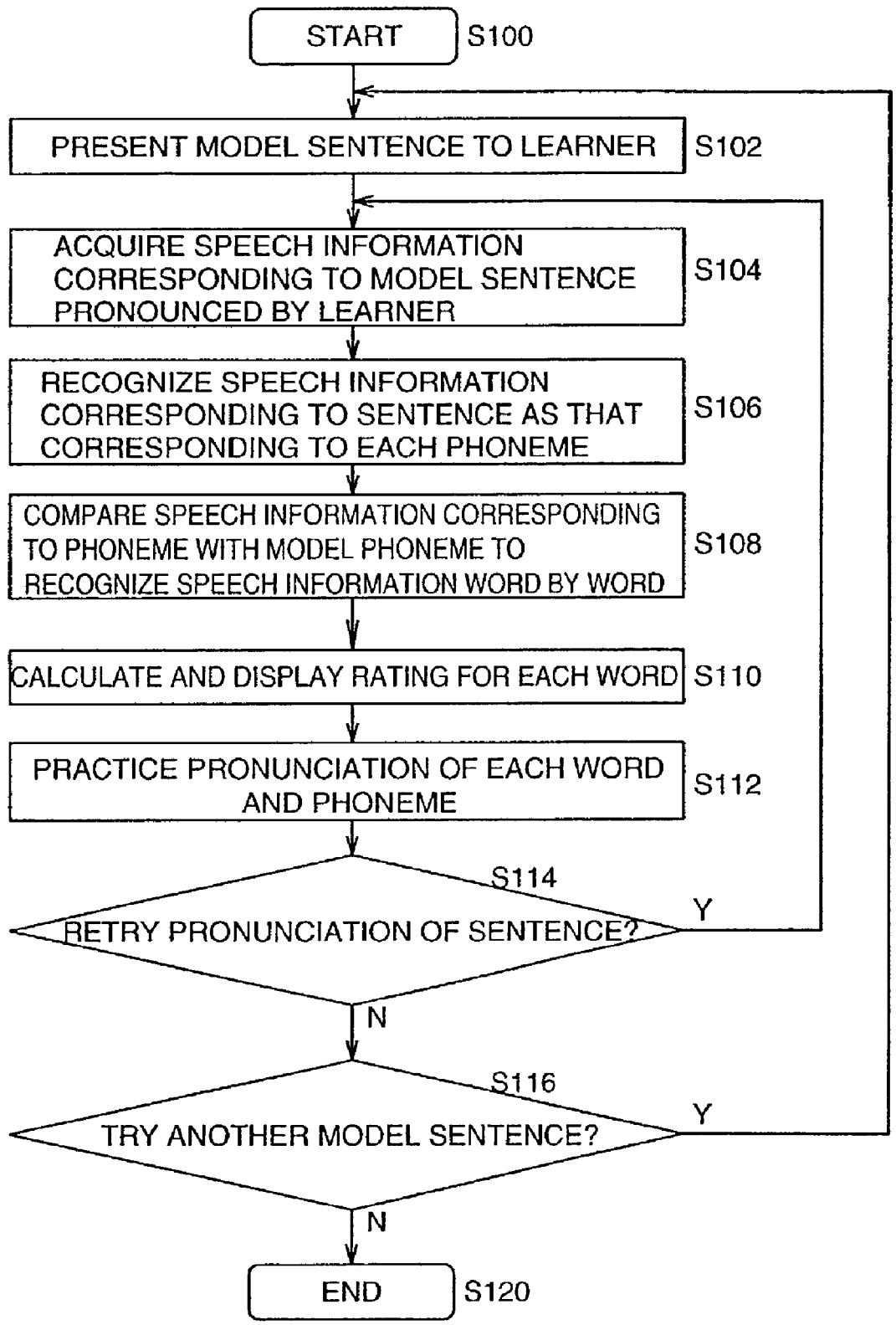
FIG. 3 is a flowchart illustrating a flow of foreign language learning implemented by the foreign language learning device 100 shown in FIG. 1.

FIG. 3 is a flowchart illustrating a flow of foreign language learning implemented by foreign language learning device 100 shown in FIG. 1.

As clearly understood from FIG. 3, through the foreign language learning by means of foreign language learning device 100, the hierarchy of speech language can be utilized to make a general evaluation of pronunciation of each sentence read out by a learner as well as an evaluation of pronunciation of each word and even each phoneme and accordingly feed back rating for the pronunciation to the learner. Then, the learner can practice, according to the given rating, pronunciation of each word or phoneme for which a low rating is given. In particular, since a rating for each word is displayed, an influence of measurement errors is reduced for respective phonemes and the learner can practice pronunciation word by word, the word-by-word pronunciation practice being easy for the learner, and thus an efficient pronunciation practice is possible.

Referring to FIG. 3, foreign language learning is started (step S100), and a model sentence to be pronounced is presented by display unit 120 to learner 2 (step S102).

Learner 2 pronounces the model sentence and accordingly speech information corresponding to the model sentence (sentence speech information) is acquired via microphone 102 and speech input/output unit 112 (step S104).

Speech recognition unit 114 recognizes, according to a signal provided from speech input/output unit 112, the sentence speech information as speech information on the basis of a phoneme (step S106).

Processor unit 116 compares the speech information of phonemes separated by speech recognition unit 114 with model phoneme information for the model sentence that is stored in data storage unit 118 to recognize the speech information on the basis of each word (step S108).

Then, for each word in the sentence speech information, processor unit 116 refers to the model phoneme information for the model sentence stored in data storage unit 118 to determine a rating for pronunciation of each word and outputs the rating onto display unit 120 (step S110). At this time, a rating for each phoneme included in each word may be output together with the rating for the word.

Learner 2 then practices, according to the rating on the basis of each word or each phoneme, pronunciation word by word or phoneme by phoneme which the learner cannot pronounce appropriately (step S112).

When it is determined that the pronunciation practice is completed, an instruction is given regarding whether or not pronunciation of the model sentence will be retried by learner 2 through an input device (keyboard or speech input unit) of personal computer 110 (step S114). When an instruction is given that retry should be made, the process returns to step S104. Otherwise, the process proceeds to the next step S116.

Then, an instruction is given that pronunciation practice of another model sentence should be tried by learner 2 via the input device of personal computer 110 (step S116). When the instruction that pronunciation practice should be done is given, the process returns to step S102. Otherwise, the process is completed (step S120).

Method of Determining Rating for each Word

A method of determining a rating for pronunciation of each word is detailed below.

Figure 4:
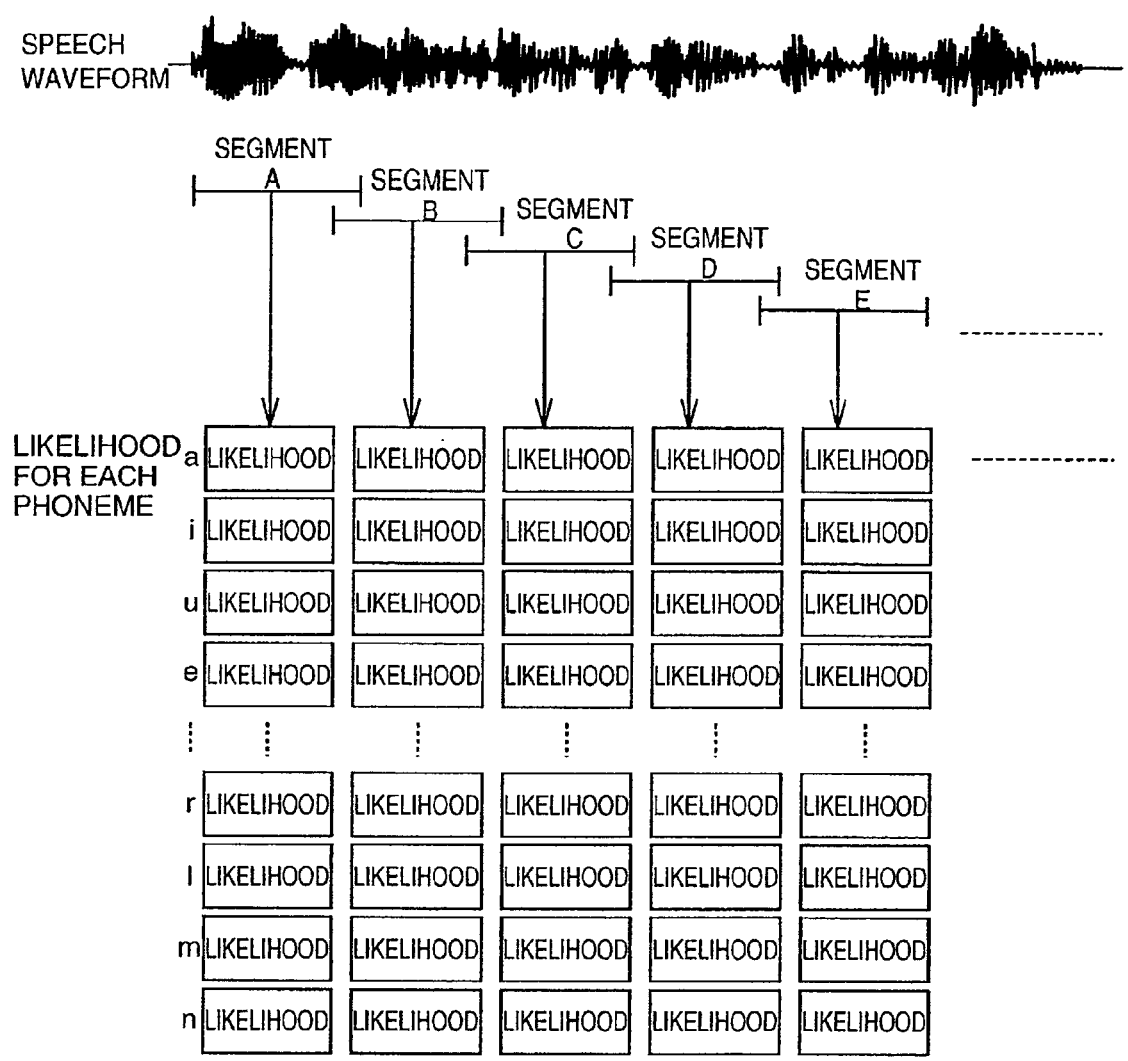
FIG. 4 is a conceptual representation illustrating an operation of a speech recognition unit 114.

FIG. 4 is a conceptual representation illustrating an operation of speech recognition unit 114.

A waveform of speech uttered by learner 2 is stored temporarily in data storage unit 118 and thus recorded. Speech recognition unit 114 divides the recorded speech waveform into segments of a certain length such as segment A, segment B, segment C and the like to determine likelihoods of phonemes for each segment. The likelihoods for each segment are determined such that respective likelihoods for all phonemes sampled in advance are evaluated, all the phonemes being all of possible phonemes which appear in English pronunciation. In other words, respective likelihoods of all English phonemes are determined for each segment.

Specifically, speech recognition unit 114 compares a model set of acoustic feature vectors of respective phonemes produced in advance from speech samples of a plurality of speakers with a set of acoustic feature vectors for a specific segment of the recorded speech to determine likelihoods for each segment by means of the well-known maximum likelihood estimation.

This maximum likelihood estimation is disclosed for example in a document "Probability, Random Variables, and Stochastic Processes (Third Edition)", Ed. Athanasios Papoulis, McGraw-Hill. Inc. New York, Tokyo (1991).

Figure 5:
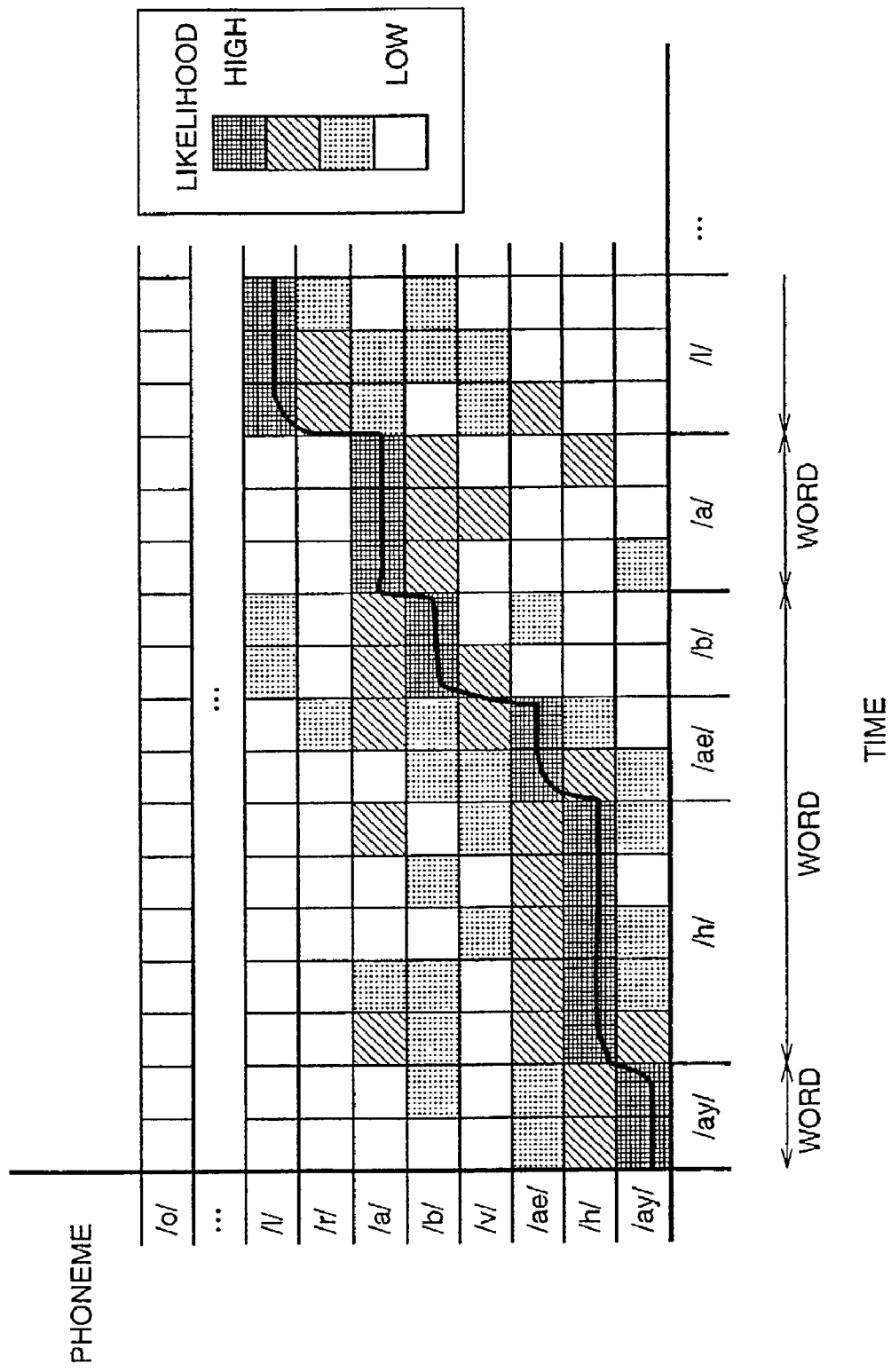
FIG. 5 is a conceptual representation showing a method of extracting phoneme speech information from speech information regarding a recorded sentence according to likelihoods on the basis of each segment.

FIG. 5 shows a distribution of likelihoods with the longitudinal axis indicating phonemes which can be appear in English language and the horizontal axis indicating those for each segment. On this plane of likelihood distribution, an optimum path of phonemes is selected that corresponds to a result of speech recognition.

The class of an optimum phoneme (with maximum likelihood) makes transition with time and accordingly it is determined that a transition to the next phoneme is made and the boundary of phonemes is recognized.

In FIG. 5, the bold line represents a path through which such an optimum phoneme passes with time among path candidates for mistakenly utterable phoneme sequences.

Figure 6:
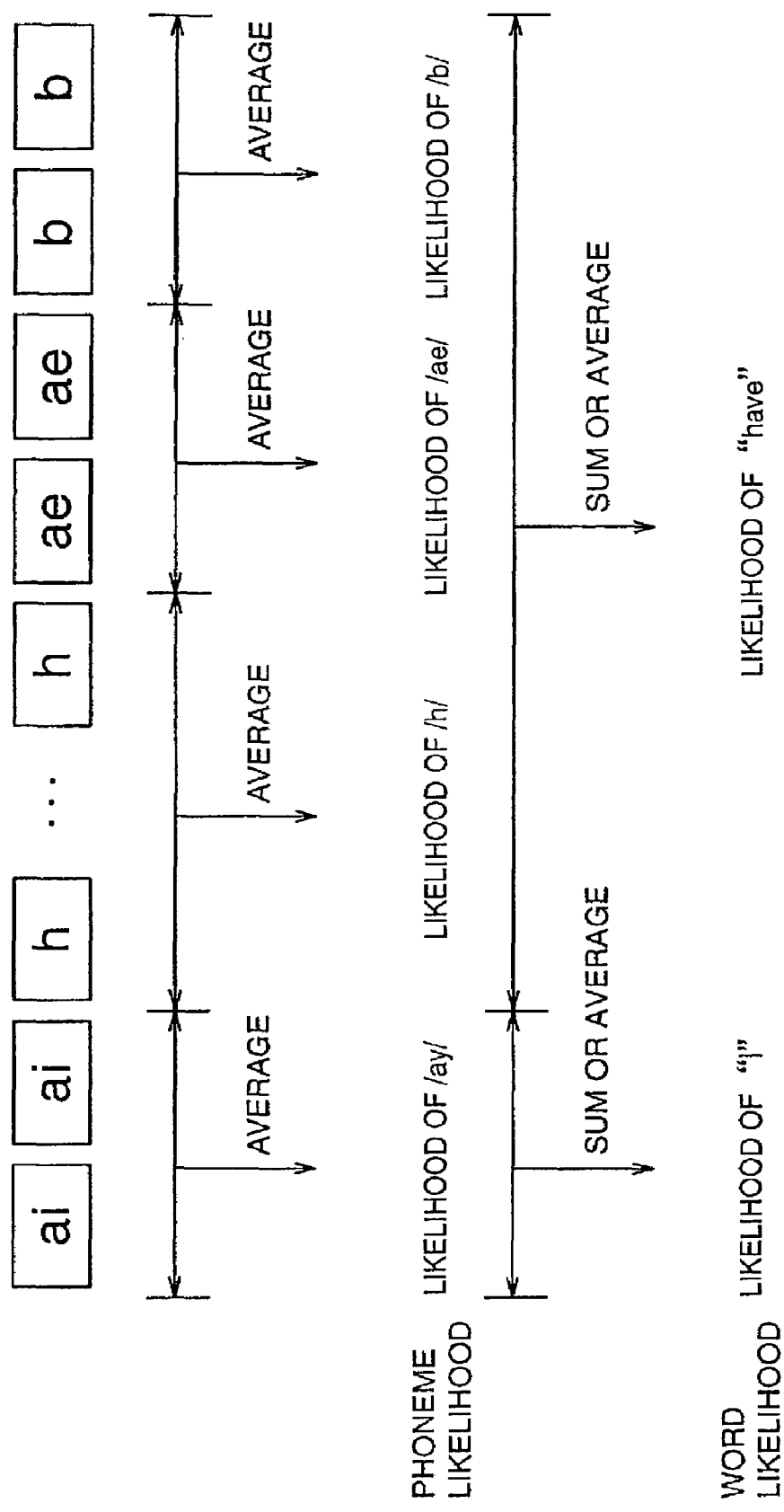
FIG. 6 is a conceptual representation showing a procedure for determining the likelihood for each phoneme of recorded speech as well as the likelihood for a word of the recorded speech.

FIG. 6 is a conceptual representation showing a procedure for determining, by processor unit 116, a likelihood of each phoneme of the recorded speech and a likelihood of a word according to thus determined phoneme speech information for each segment of the recorded speech.

Specifically, processor unit 116 calculates the average of likelihoods for each phoneme recognized from the recorded speech to determine the likelihood of each phoneme.

Processor unit 116 further determines the likelihood of each word by calculating the sum or average of phoneme likelihoods for each word according to respective likelihoods of phonemes along the path as shown in FIG. 5 among the mistakenly utterable candidate sequences determined from the recorded speech waveform.

More specifically, when content-descriptive information, for example, a model sentence "I have a red pen" is given in advance, processor unit 116 determines the likelihood of each word (hereinafter "word likelihood") by calculating the sum or average of respective likelihoods of phonemes included in each word according to information about phonetic notation of the model sentence, namely /ai : h ae v : a : red : pen/ and to information about the boundary of words (":" included in the phonetic notation) along the path among mistakenly utterable candidate sequences. The information about the array of phonemes of the model sentence and the information about word boundary are hereinafter referred to as "model phoneme array information" as a whole.

Figure 7:
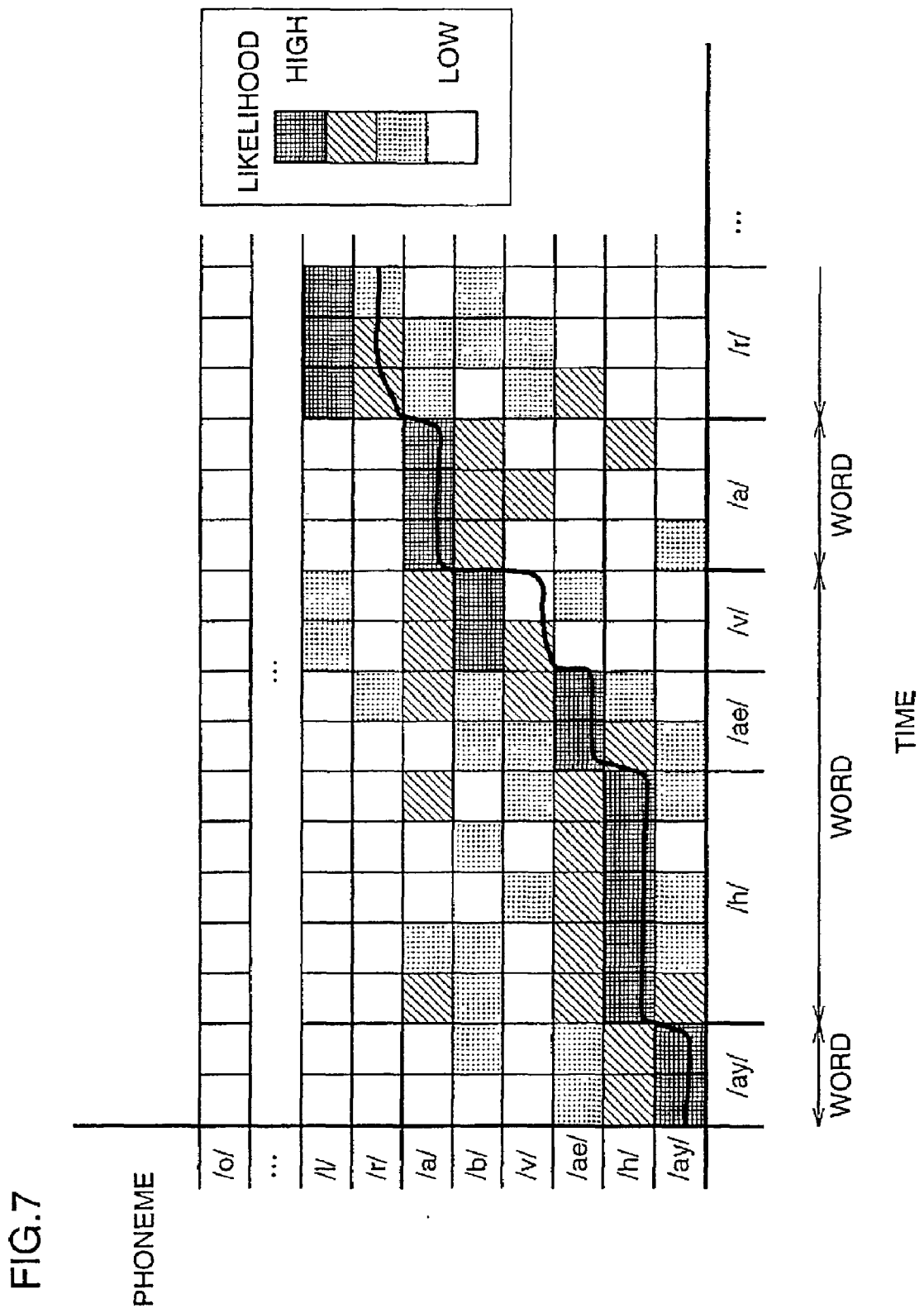
FIG. 7 shows a path through which phonemes make transition with time when pronunciation is exactly the same as that of a model sentence and shows a procedure for determining likelihoods for evaluation of pronunciation.

FIG. 7 illustrates a procedure for determining, on the likelihood distribution plane shown in FIG. 5, a path through which phonemes change with time when the model sentence is pronounced exactly as it is and likelihoods for evaluating the pronunciation.

Referring to FIG. 7, according to the content-descriptive information given in advance, processor unit 116 determines word likelihood by calculating the sum or average of phoneme likelihoods of phonemes included in each word, along the path corresponding to the phoneme array when the model sentence with the content-descriptive information is exactly pronounced, through the procedure as described above in conjunction with FIGS. 5 and 6.

Then, processor unit 116 compares each word likelihood determined as described above along the path corresponding to the phoneme array exactly the same as the content-descriptive information (phonetic array as per the model phoneme array information) with each word likelihood along a mistakenly utterable candidate path for each word determined from the recorded speech waveform, and accordingly determines a rating from the relative relation therebetween.

It is assumed for example that each word likelihood determined along the path corresponding to the phoneme array exactly the same as the content-descriptive information is referred to as "word likelihood of ideal path" and the sum of word likelihoods determined along the mistakable path from the recorded speech waveform is referred to "word likelihood of mistakenly utterable candidate path", a rating for each word can be determined as shown below. The procedure is not limited to the particular one as described here.

(word rating)=(word likelihood of ideal path)/(word likelihood of ideal path+word likelihood of mistakenly utterable candidate path)×100

The rating for each word can be determined and displayed for a sentence pronounced by a learner through the procedure as described above.

It is assumed for example that each phoneme likelihood determined along the path corresponding to the phoneme array exactly the same as the content-descriptive information is referred to as "phoneme likelihood of ideal path" and the sum of phoneme likelihoods determined along the mistakenly utterable candidate path from the recorded speech waveform is referred to "phoneme likelihood of mistakenly utterable candidate path", and then a rating for each phoneme can also by determined as follows. This procedure is not limited to the particular one described here.

(phoneme rating)=(phoneme likelihood of ideal path)/ (phoneme likelihood of ideal path+phoneme likelihood of mistakenly utterable candidate path)× 100

In this way, in addition to the rating for each word of a sentence pronounced by a learner, a rating for each phoneme included in the word can be displayed.

The description above of the present invention is applied to a structure for acquiring speech information for each word by segmenting sentence speech information into phoneme information. However, the structure may be accomplished by directly separating the sentence speech information into speech information for each word.

SECOND EMBODIMENT

The first embodiment is described for the structure of the foreign language learning device which recognizes a sentence in a foreign language read out by a learner to display a rating for each word or each phoneme and accordingly enhance the learning efficiency.

Regarding a second embodiment, a description is given for a structure of a foreign language learning device and a foreign language learning method by which a learner can efficiently practice pronunciation according to the rating for each word (or each phoneme) as described above.

Figure 8:
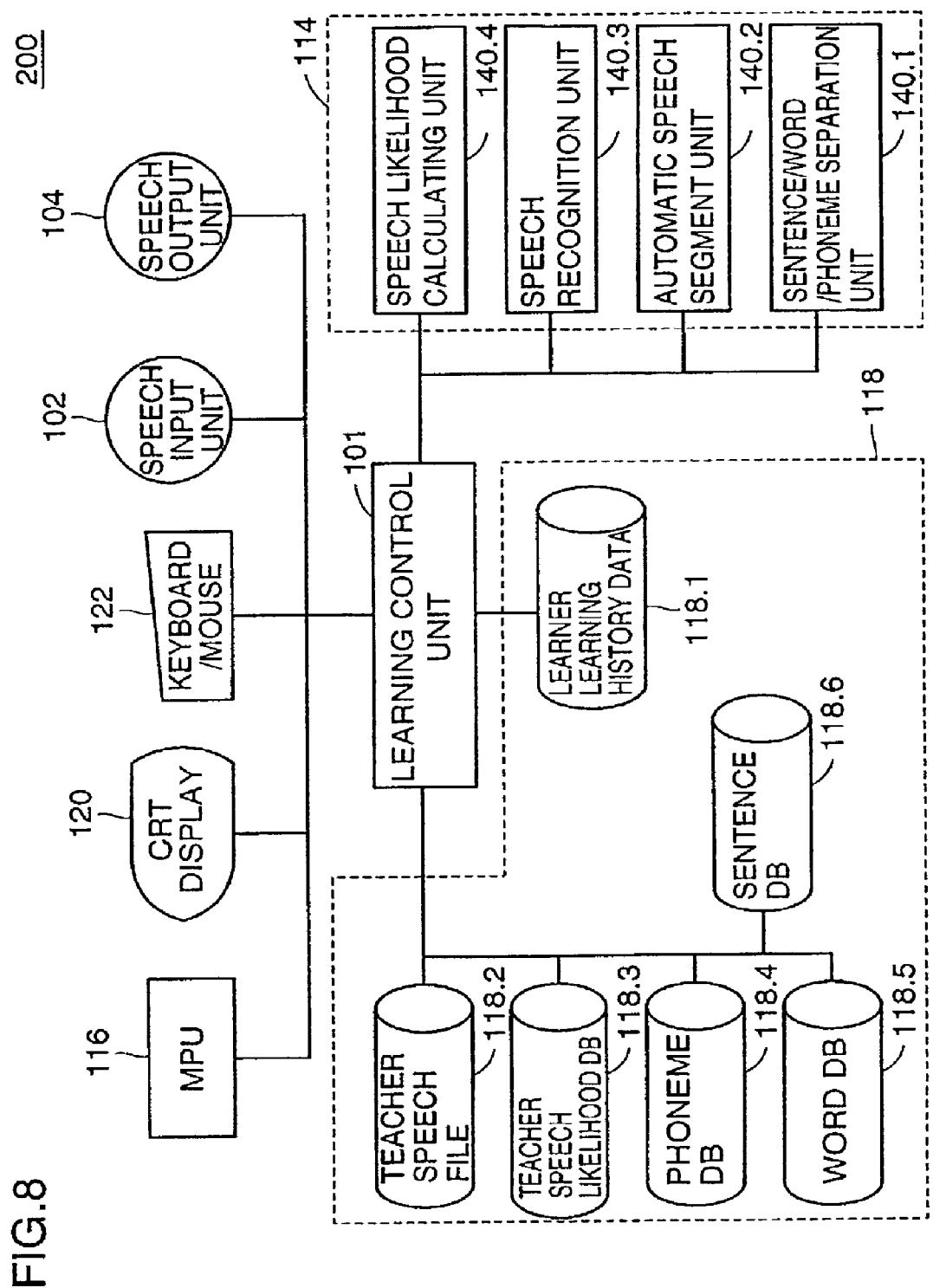
FIG. 8 is a schematic block diagram illustrating a structure of a foreign language learning device 200 according to a second embodiment.

FIG. 8 is a schematic block diagram illustrating a structure of a foreign language learning device 200 according to the second embodiment.

Foreign language learning device 200 has its structure basically the same as that of foreign language learning device 100 according to the first embodiment.

Specifically, referring to FIG. 8, foreign language learning device 200 includes a speech input unit 102 (e.g. microphone) for acquiring speech produced by a learner, an MPU 116 receiving an output of speech input unit 102 for processing speech information corresponding to a sentence pronounced by the learner to determine a rating for pronunciation by the learner for each word included in that sentence in accordance with an expected pronunciation, a CRT display 120 for presenting an original sentence to be pronounced by the learner that is supplied from MPU 116 and displaying a rating for the learner's pronunciation of each word, the rating determined word by word, and a keyboard mouse 122 for receiving data input to foreign language learning device 200 by the learner.

Foreign language learning device 200 further includes a learning control unit 101 for controlling the entire operation of the foreign language learning device, a speech recognition unit 114 controlled by learning control unit 101 for performing a speech recognition process on sentence information supplied from the speech input unit, and a data storage unit 118 controlled by learning control unit 101 for storing data necessary for a foreign language learning process.

Speech recognition unit 114 includes an automatic speech segment unit 140.2 for extracting a speech spectral envelope from speech data supplied from speech input unit 102 and then segmenting a speech signal, a speech likelihood calculating unit 140.4 for calculating a speech likelihood for identifying phonemes of unit language sound, a sentence/word/ phoneme separation unit 140.1 according to the result of calculation by speech likelihood calculating unit 140.4 for separating a sentence and thus extracting a phoneme or a word from the sentence, and a speech recognition unit 140.3 according to the result of separation by sentence/word/phoneme separation unit 140.1 for recognizing a sentence speech based on syntactic parsing or the like.

Data storage unit 118 includes a sentence database 118.6 holding sentence data to be presented to a learner, a word database 118.5 for words constituting the sentence data, and a phoneme database 118.4 holding data regarding phonemes included in word database 118.5.

Data storage unit 118 further includes a learner learning history data holding unit 118.1 for holding learning history of the learner, a teacher speech file 118.2 for holding teacher speech pronounced by a native speaker corresponding to the data stored in sentence database 118.6, and a teacher speech likelihood database for holding likelihood data calculated by speech recognition unit 114 for speech in the teacher speech file.

Figure 9:
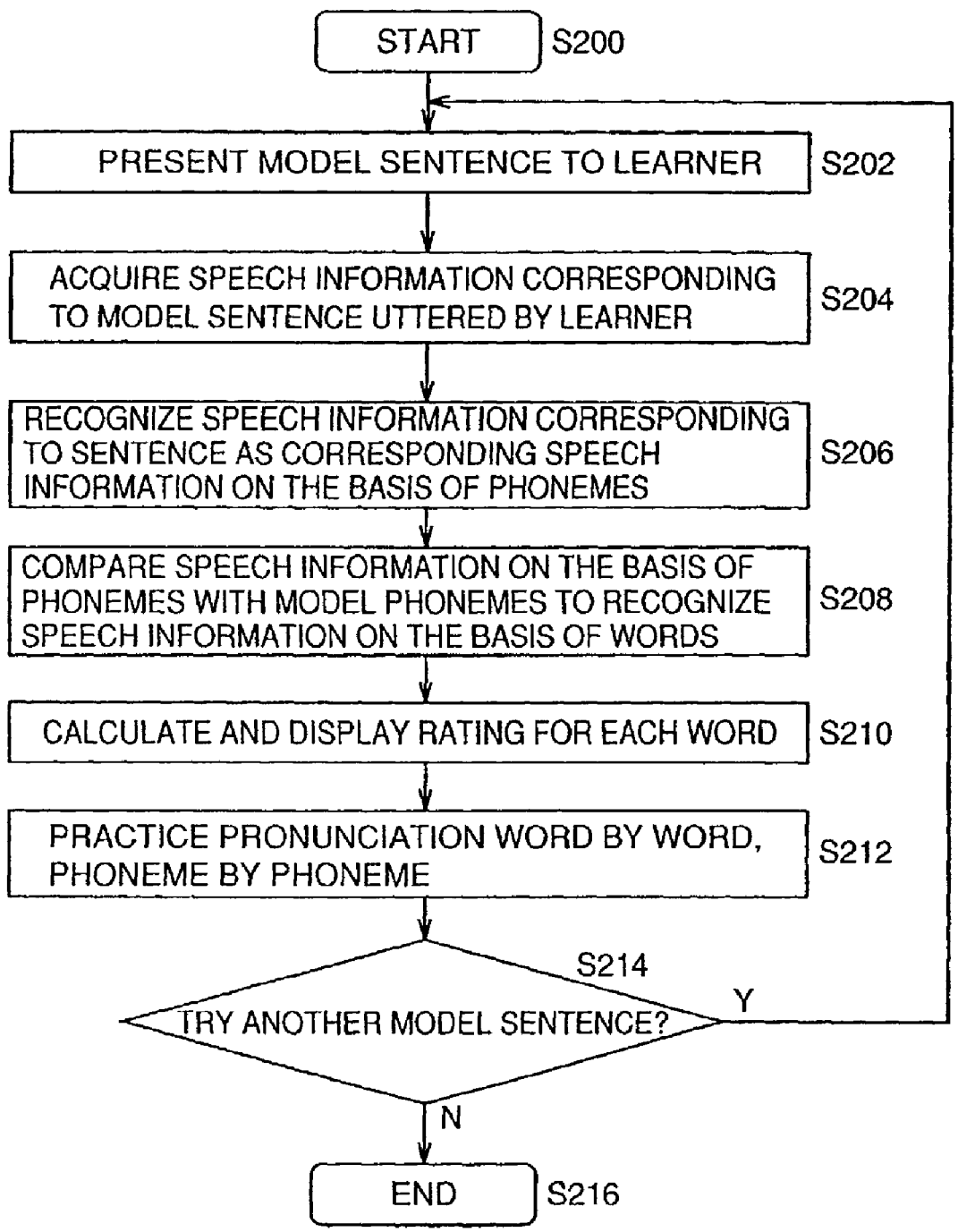
FIG. 9 is a flowchart illustrating a foreign language learning process by the foreign language learning device 200 shown in FIG. 8.

FIG. 9 is a flowchart illustrating a process of foreign language learning by means of foreign language learning device 200 shown in FIG. 8.

Referring to FIG. 9, foreign language learning device 1 starts its process (step S200), and then a model sentence indicated on CRT display 120 is presented to a learner according to sentence data held in sentence database 118.6 (step S202).

The learner then reads out the presented model sentence, and speech information corresponding to the model sentence read aloud by the learner is acquired via speech input unit 102 (step S204).

Then, automatic speech segment unit 140.2 and sentence/word/phoneme separation unit 140.1 operate to recognize speech information corresponding to the sentence as speech information on the basis of phonemes (step S206).

Speech recognition unit 140.3 recognizes speech information on the basis of words by comparing the speech information on the acquired phonemes with model phonemes according to the data held in phoneme database 118.4 (step S208).

According to thus recognized speech information, MPU 116 calculates a rating for each a word based on the likelihood information calculated by speech likelihood calculating unit 140.4 and data held in teacher speech likelihood database 118.3, and the result of calculation is presented to the learner via CRT display 120 (step S210).

Then, the learner practices pronunciation word by word or phoneme by phoneme (step S212).

Then, the learner is asked a question via CRT display 120 about whether or not the learner makes a practice for another model sentence. When the learner selects practice of another model sentence via keyboard/mouse 122, the process returns to step S202. When the learner selects ending of the practice, the process is completed (step S216).

Figure 10:
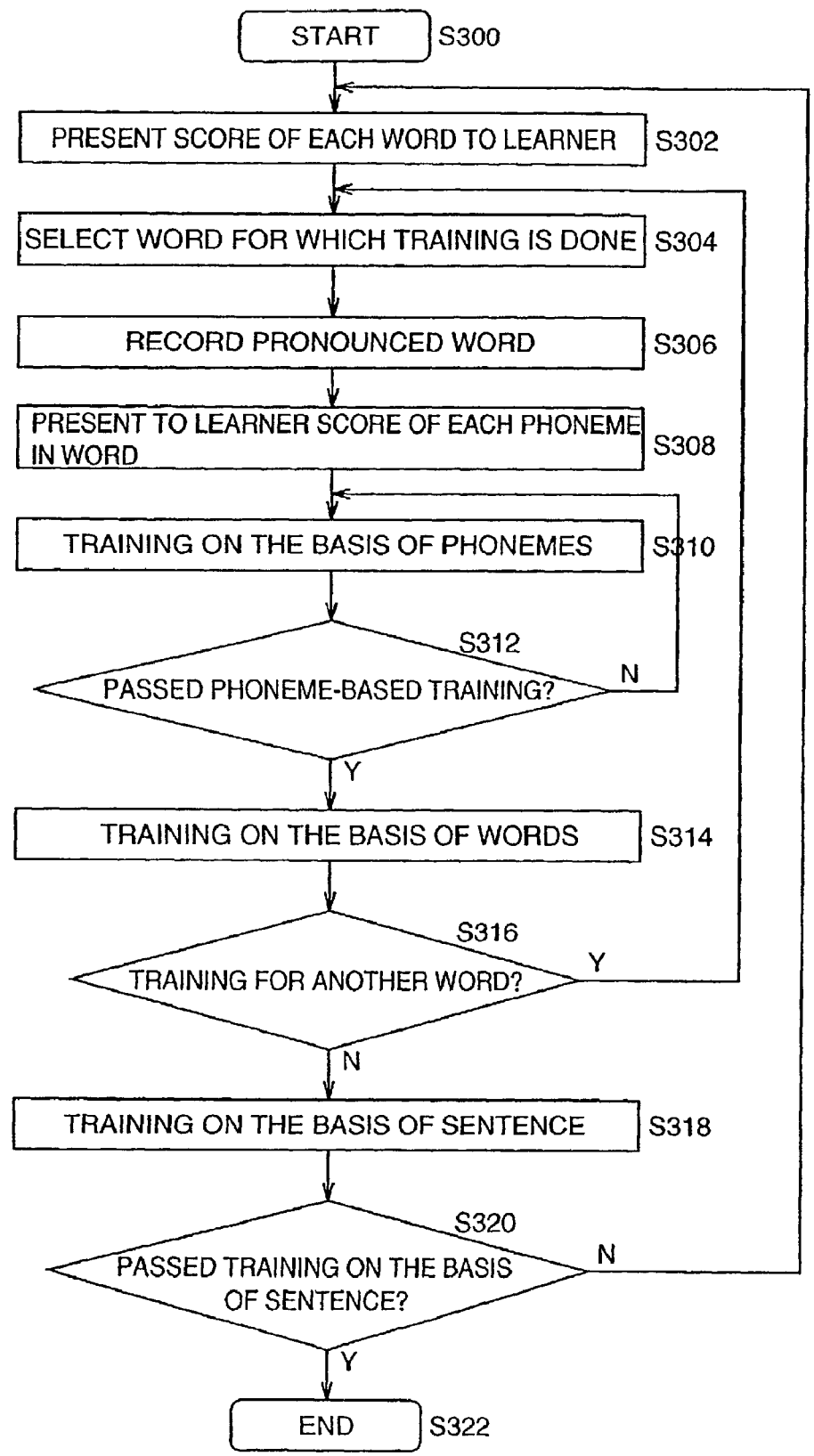
FIG. 10 is a flowchart showing, in more detail, a process followed in the steps of calculating and displaying a rating for each word and practicing pronunciation word by word and phoneme by phoneme.

FIG. 10 is a flowchart illustrating in more detail step S210 for calculating and displaying a rating for each word and step S212 for practice of pronunciation word by word or phoneme by phoneme among those steps shown in FIG. 9.

When a score of each word is presented to the learner (step S302), the learner selects via keyboard/mouse 122 a word for which training should be done (step S304).

Accordingly, pronunciation of the word by the learner is recorded (step S306), and a score of each phoneme in the word is presented to the learner (step S308).

The learner then does training on the basis of phonemes (step S310), and determination is made as to whether or not the learner has passed the training on the basis of phonemes (step S312). When the learner has passed the phoneme training, the process proceeds to the next step S314. Otherwise, the process returns to step S310.

When the learner has passed the phoneme training, the process proceeds to training on the basis of words (step S314).

When the word training is completed, the learner is asked a question about whether of not the learner does training for another word via CRT display 120. According to information entered by the learner from keyboard/mouse 122, the process returns to step S304 when the learner takes training of another word. Otherwise, the process proceeds to the next step S318.

When the training on the basis of words is completed, training on the basis of sentence is done (step S318).

Then, it is determined whether or not the learner has passed the sentence training (step S320). When the learner has not passed the sentence training, the process returns again to step S302.

When it is determined that the learner has passed the sentence training, the process is completed (step S322).

Figure 11:
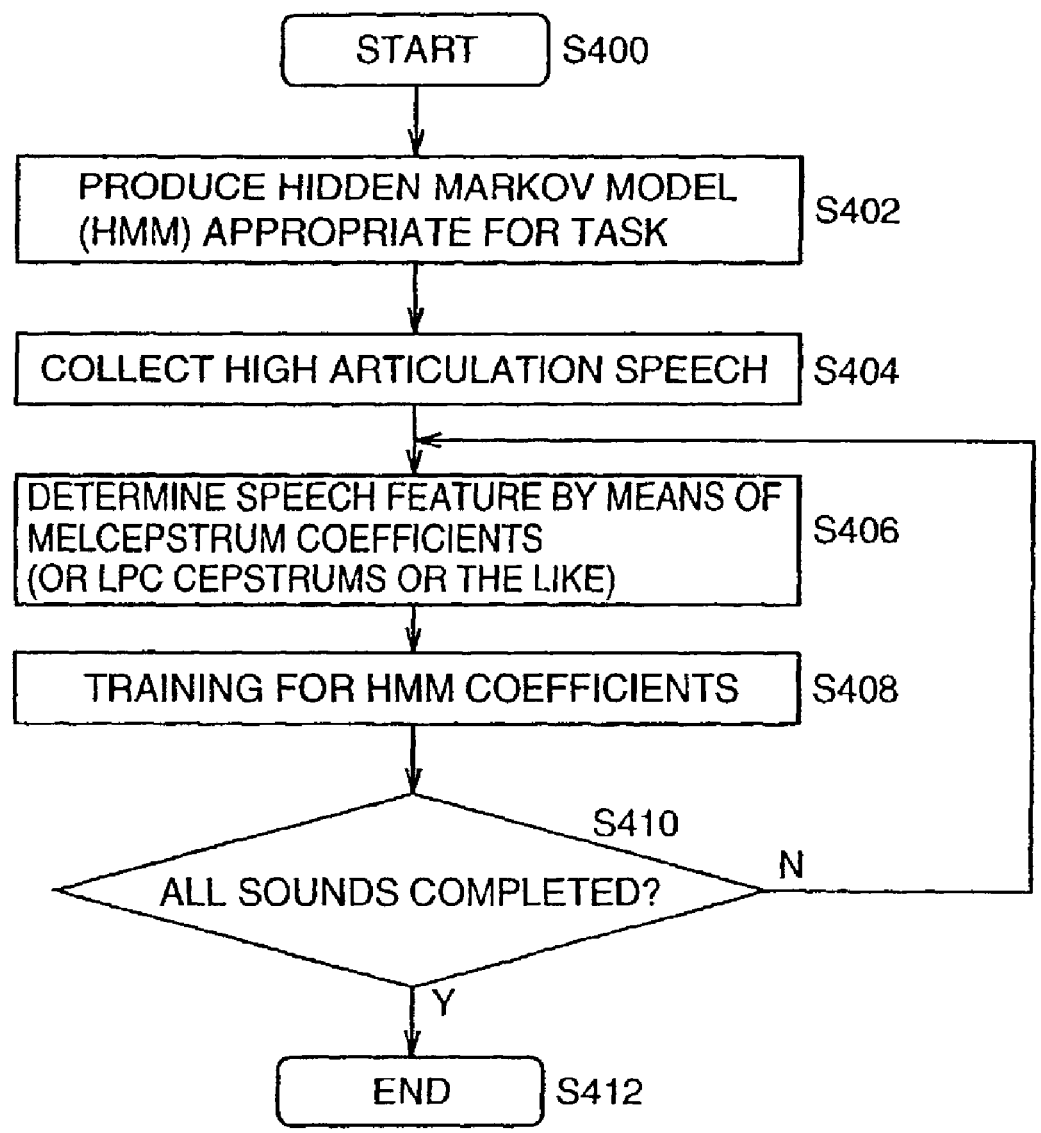
FIG. 11 is a flowchart illustrating a process for preliminarily performing a learning process with respect to a Hidden Markov Model for speech recognition.

FIG. 11 is a flowchart illustrating a learning process performed in advance with respect to a Hidden Markov Model (HMM) for speech recognition so as to calculate a rating for a phoneme, word or sentence for which training is done as shown in FIG. 10.

Referring to FIG. 11, the learning process starts (step S400), and then a Hidden Markov Model (HMM) is produced for vocabulary with which the training is done (step S402).

Then, according to pronunciation by the learner, speech with a high articulation is collected (step S404).

Based on the speech produced by the learner, melcepstrum coefficient, LPC (Linear Predictive Coding) cepstrum or the like is used to determine speech feature as numerical data (feature vectors) (step S406).

Based on the speech feature vectors thus determined, training of HMM coefficients of the Hidden Markov Model is done (step S408).

It is determined whether or not all speech processes are done that are necessary for learning as described above (step S410). If not, the procedure returns to step S406. If done, the procedure is completed (step S412).

Figure 12:
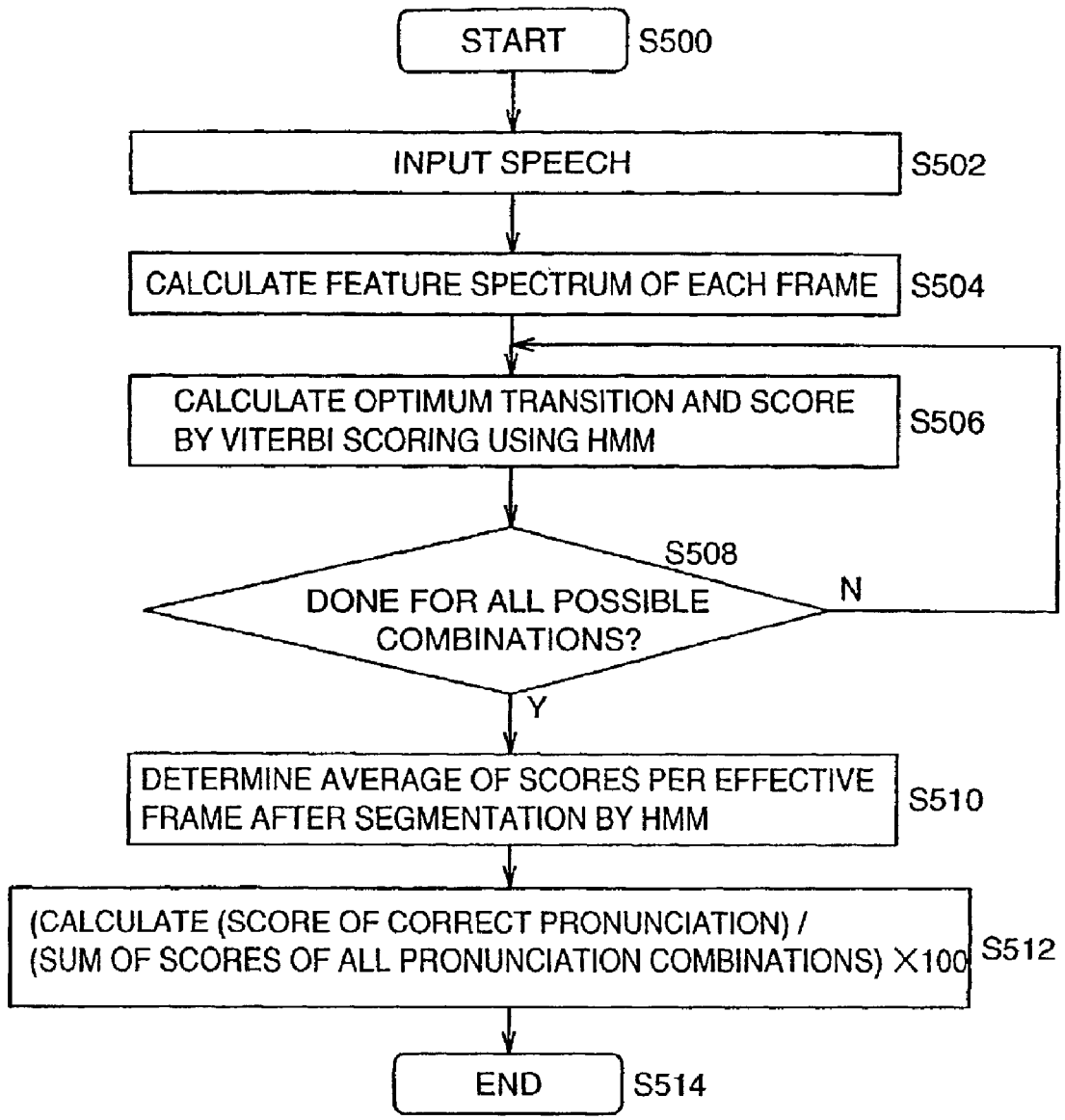
FIG. 12 is a flowchart illustrating a process flow for calculating a rating for each phoneme in each word.

FIG. 12 is a flowchart illustrating a flow of calculating a rating for each phoneme in each word (step S308 in FIG. 10) according to the Hidden Markov Model for which the pre-learning process has been done as shown in FIG. 11.

Referring to FIG. 12, a process of calculating a rating starts (step S500), speech is input (step S502), and then feature vectors are calculated for each frame segment to be sampled (step S504).

Then, the Hidden Markov Model is used to perform Viterbi scoring and thus perform a matching calculation for deriving transition of an optimum phoneme (step S506).

A phoneme transition path is then calculated for all of the possible combinations and whether or not this calculation is completed is determined (step S108). If not, this flow returns to step S506. If completed, the flow proceeds to the next step S510.

For each effective frame resultant from segmentation by the Hidden Markov Model, the average of scores for each frame is calculated (step S510).

A rating is then calculated for each phoneme for example according to the calculation as shown below.

(rating)=(score of a phoneme correctly pronounced)/
(sum of scores of all combinations of possible
(probability is not 0) phonemes)×100

The rating is thus calculated and accordingly this process is completed (step S514).

When the learner practices pronunciation phoneme by phoneme, the learning effect is enhanced by presenting appropriate information to the learner as described below.

Figure 13:
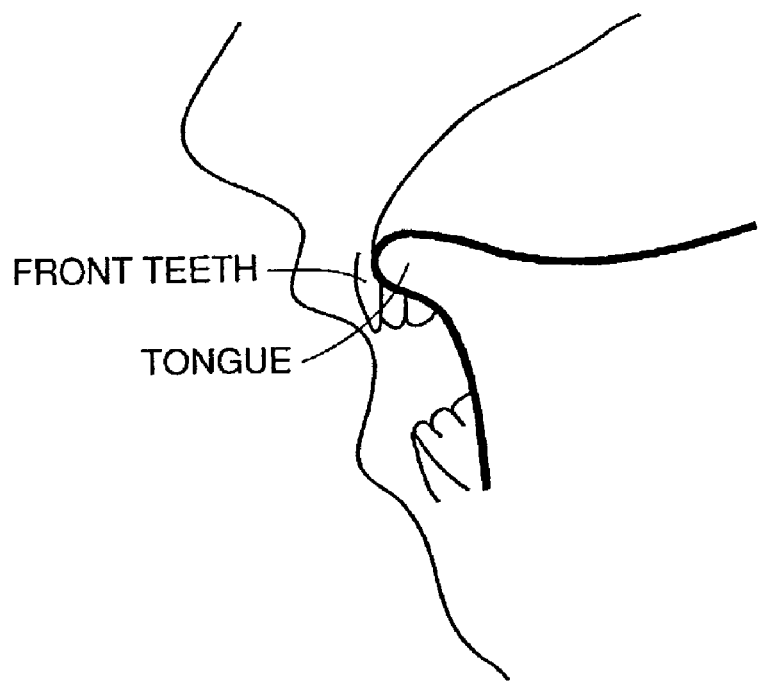
FIG. 13 is a first representation showing a shape of a vocal tract when "L" is pronounced.
Figure 14:
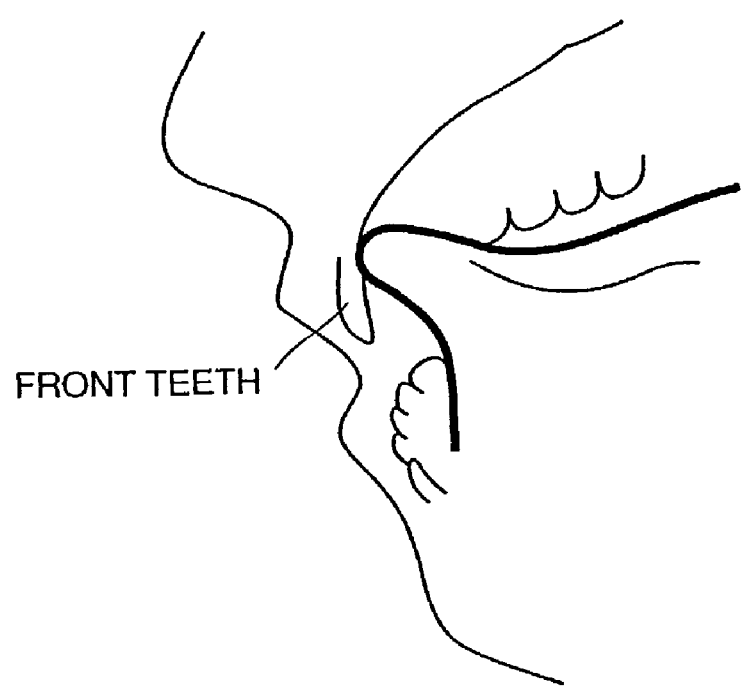
FIG. 14 is a second representation showing a shape of the vocal tract when "L" is pronounced.

FIGS. 13 and 14 show information thus presented when "L" is pronounced, the information presented by means of a shape of the vocal tract (resonance cavity of sound extending from the glottis to lips).

Figure 15:
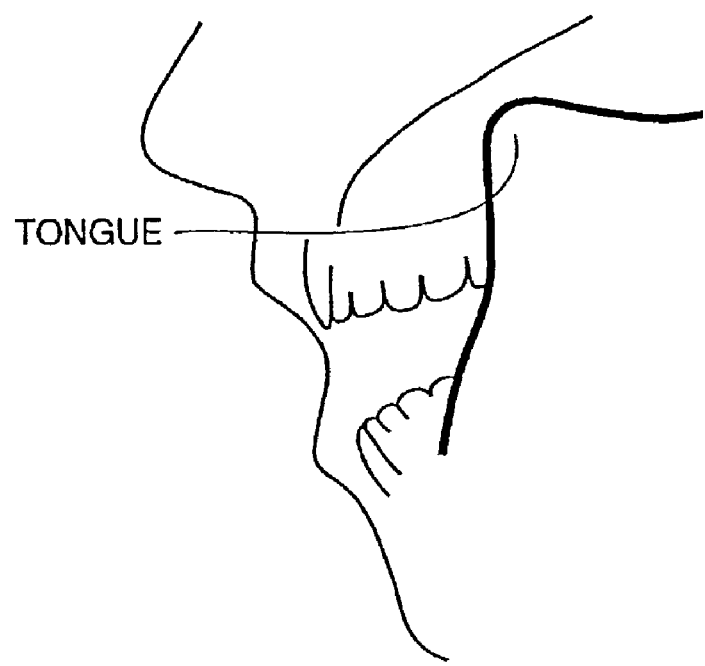
FIG. 15 is a first representation showing a shape of the vocal tract when "R" is pronounced.
Figure 16:
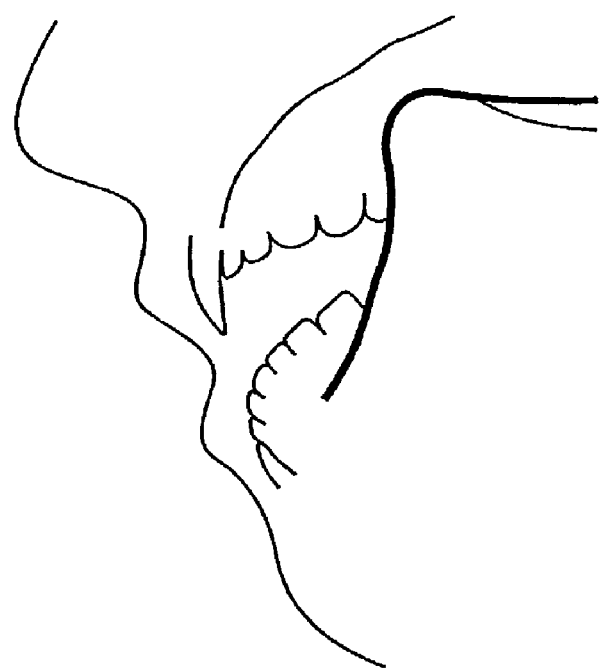
FIG. 16 is a second representation showing a shape of the vocal tract when "R" is pronounced.

FIGS. 15 and 16 show exemplary computer graphics presenting a shape of the resonance cavity when "R" is pronounced.

A sound with each phoneme feature is produced by the shape of the vocal tract as described above. However, in usual, the learner cannot see such a shape and movement of the vocal tract.

In particular, it is possible to visualize, by means of three-dimensional computer graphics, the shapes, relative positions, movements and the like of organs (tongue, palate and the like) in the oral cavity which are highly concerned with the phoneme features and for which the learner can control movements. For example, the neck part may be made transparent to allow the learner to see and identify that part. Such a visualization makes it possible to provide the learner with knowledge about the way in which each organ should be moved when each phoneme is pronounced.

Figure 17:
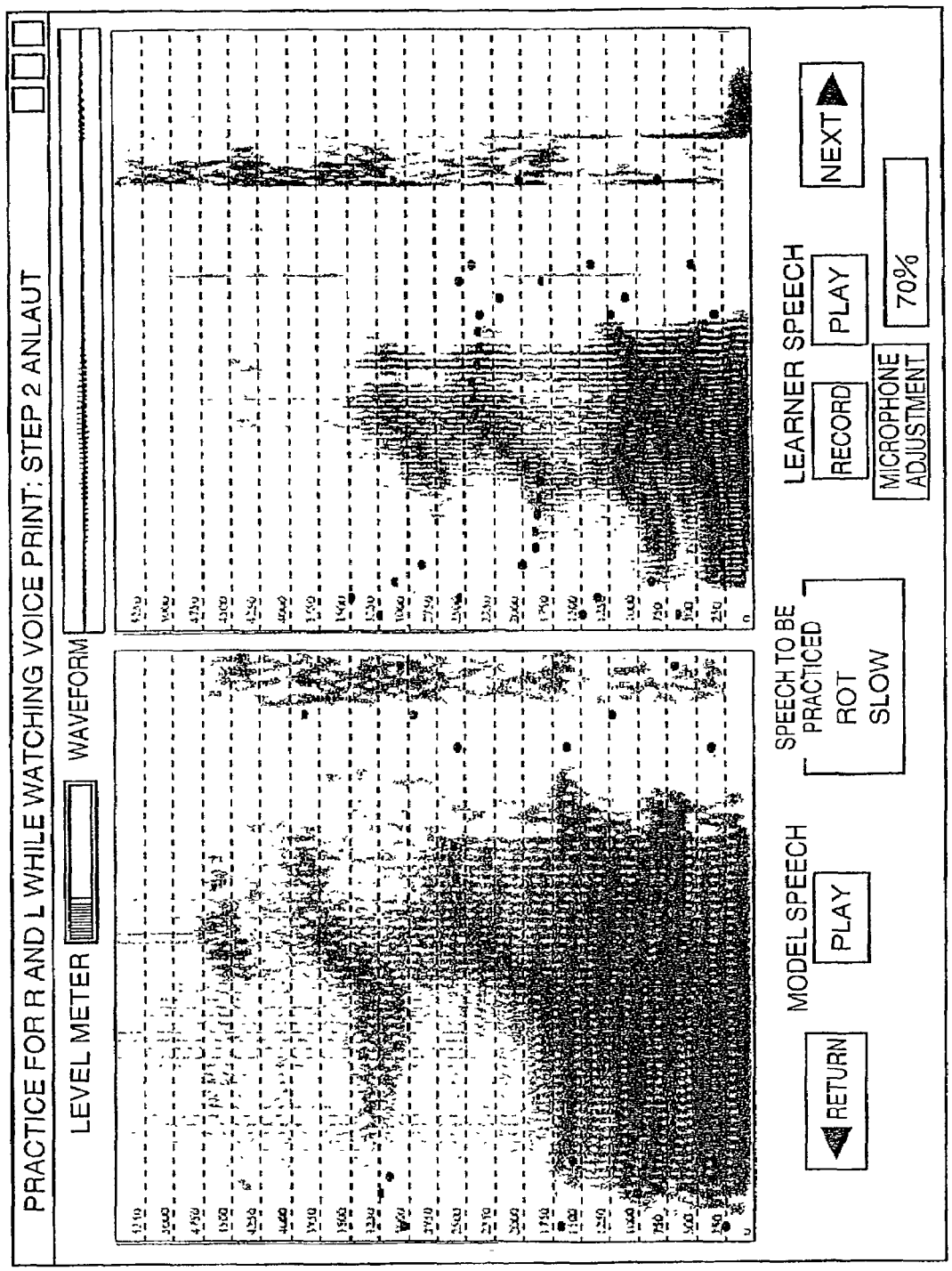
FIG. 17 shows a change in resonance frequency pattern with time, presented as information to a learner practicing phoneme pronunciation.

FIG. 17 shows change in resonance frequency pattern with time (voice print) that is presented as another exemplary information to the learner who practices phoneme pronunciation.

Referring to FIG. 17, respective voice prints of teacher speech and learner speech are compared. The learner repeats pronunciation so that the voice print pattern of the learner approaches to that of the teacher speech.

The voice prints are presented by visualization of change in sound resonance frequency pattern with time by means of a fast Fourier transformation (FFI).

Vowels and a part of consonants ([r], [l], [w], [y] and the like) of phonemes are produced with vibration of the vocal tract and such sounds has periodicity. The spectrum of the sound exhibits its peaks (formants) with a certain pattern. Each phoneme is characterized by the pattern of the formants. Then, for these sounds, linear predictive coding APC) is used to estimate the peaks of the spectrum, the peaks are superimposed on the voice print and indicated by solid circles in FIG. 17, and accordingly the phoneme feature can clearly be shown.

Figure 18:
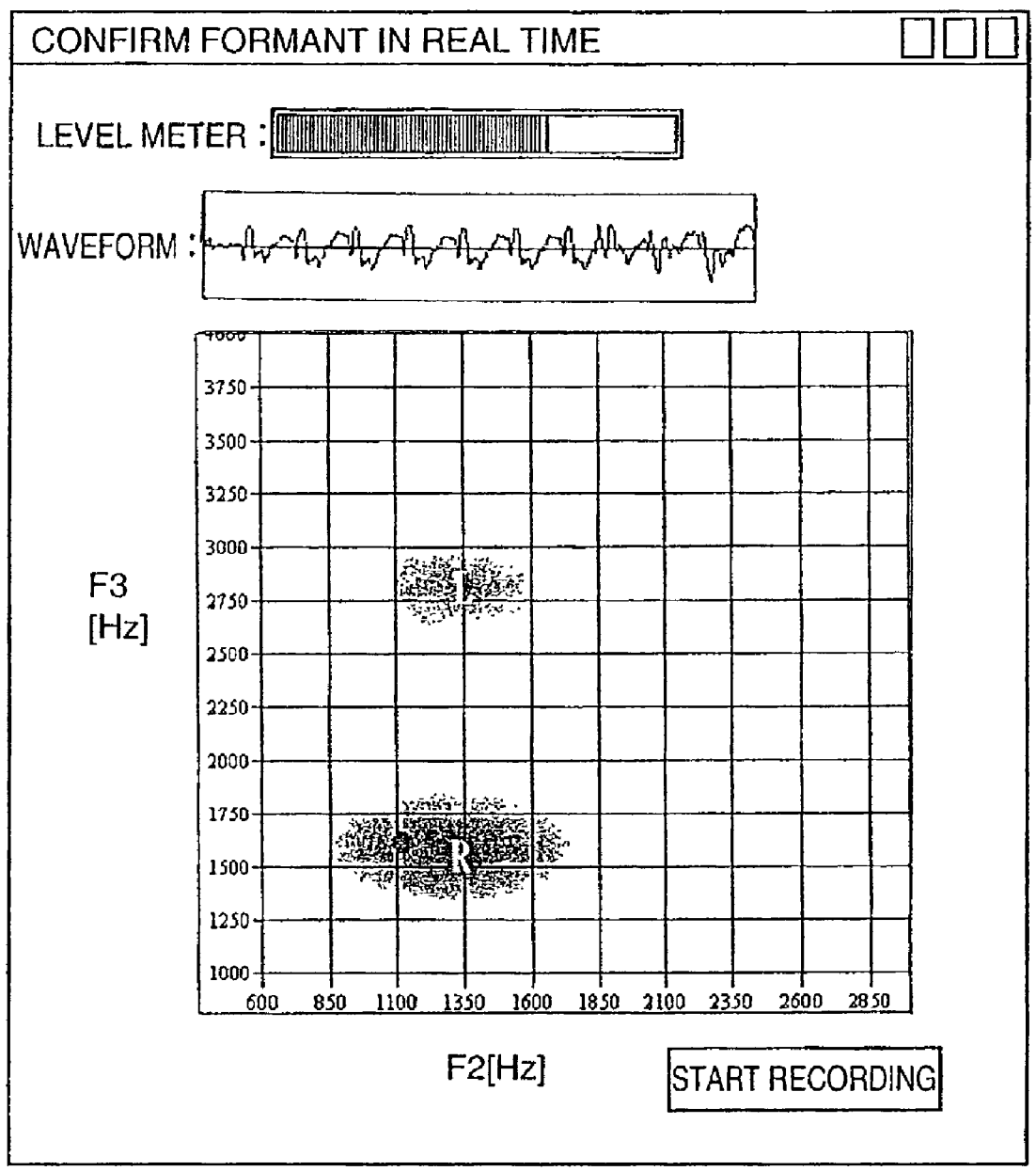
FIG. 18 shows a display screen indicating a formant position presented as another information to the learner practicing phoneme pronunciation.

FIG. 18 shows a screen presented, as still another exemplary information, to the learner who practices pronunciation of phonemes, the screen showing the position of a formant.

Referring to FIG. 18, the position of the formant is confirmed in real time to correct pronunciation. For vowels and the part of consonants ([r], [l], [w], [y] and the like), the formant is calculated as described above to be presented on the screen in real time.

At this time, the relative relation of three formants (first, second and third formants) in the order from the lower one is shown, that is important in characterizing a phoneme, is shown by combining two of the three formants in a two-dimensional manner. In FIG. 18, the second formant (F2) is indicated on the horizontal axis and the third formant (F3) is indicated on the vertical axis. The sound L distributes in the vicinity of F3 =2800 Hz while the sound R distributes in the vicinity of F3=1600 Hz. The formant of sound produced by the learner is indicated by the solid circle that is understood to be in the region of sound R on F2-F3 plane.

The learner can proceed with the learning of pronunciation of phonemes while confirming, in real time, the shape of organs for producing higher sounds and whether or not the shape is correct.

Although the description above is given separately for each of the three displayed screens as shown in FIGS. 13 to 18, the screens may appropriately be combined to achieve a more efficient pronunciation practice.

In addition, the model display of the vocal tract shape in FIGS. 13 to 16, display of voice print in FIG. 17, and display of formant in FIG. 18 are presented on the basis of each phoneme. However, when phonemes are successively pronounced as a word, the phonemes may successively be shown on the screen.

The description above is given for the structure of the foreign language learning device. However, the present invention is not limited to this structure and may be implemented by using a recording medium on which recorded software for performing the foreign language learning method as described above and operating the software by a personal computer or the like having a speech input/output function.

The software for executing the foreign language learning method as described above may not only be installed in a personal computer or the like as a recording medium but also be installed in a personal computer or the like having a speech input/output function through an electrical communication line such as the Internet.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A foreign language learning device comprising:
   a storage device storing in advance a model sentence to be pronounced by a learner and model phoneme array information including an array of phonemes and word boundaries of said model sentence;
   word separation means for receiving sentence speech information, the sentence speech information corresponding to speech produced successively by the learner when the learner utters the model sentence including a plurality of words, to separate said sentence speech information into word speech information on the basis of each word included in said sentence using said model phoneme array information;
   likelihood determination means for evaluating degree of matching of each said word speech information with a model speech; and
   display output means for presenting said model sentence to said learner to prompt said learner to utter said model sentence and displaying, for each said word, a resultant evaluation determined by said likelihood determination means.

2. The foreign language learning device according to claim 1,
   wherein
   said word separation means includes
   phoneme recognition means for recognizing said sentence speech information on the basis of each phoneme information, and
   word speech recognition means for recognizing said word speech information for each said word according to said phoneme information and said model phoneme array information after the separation.

3. The foreign language learning device according to claim 2, wherein
   said phoneme recognition means includes phoneme likelihood determination means for determining likelihood of each phoneme information in said sentence speech information, with respect to each of phonemes that can be included in said foreign language, and
   said likelihood determination means evaluates the degree of matching of each said word speech information by comparing, on a likelihood distribution plane of phoneme information in said sentence speech information, each word likelihood determined along a path followed when pronunciation follows a phoneme array exactly the same as said model phoneme array information with the sum of word likelihoods determined along mistakenly utterable candidate paths from a speech waveform of pronunciation by the learner.

4. A foreign language learning method comprising the steps of:
   receiving sentence speech information, the sentence speech information corresponding to speech produced successively by a learner when the learner utters a sentence including a plurality of words, and accordingly separating said sentence speech information into word speech information on the basis of each word included in said sentence using model phoneme array information including an array of phonemes and word boundaries of the sentence;

evaluating degree of matching of each said word speech information with a model speech; and displaying, for each said word, a resultant evaluation of each said word speech information.

5. The foreign language learning method according to claim 4, further comprising the step of presenting a model sentence to said learner in advance, wherein said step of separating said sentence speech information into said word speech information includes the steps of recognizing said sentence speech information on the basis of each phoneme information, and recognizing said word speech information for each said word according to model phoneme array information which corresponds to the model sentence presented to said learner and concerns the whole of said model sentence and according to said phoneme information after the separation.

6. The foreign language learning method according to claim 5, wherein said step of recognizing said sentence speech information on the basis of each phoneme information includes the step of determining likelihood of each phoneme information in said sentence speech information, with respect to each of phonemes that can be included in said foreign language, and in said step of evaluating the degree of matching with the model speech, the degree of matching for each said word is evaluated by comparing, on a likelihood distribution plane of phoneme information in said sentence speech information, each word likelihood determined along a path followed when pronunciation follows a phoneme array exactly the same as said model phoneme array information with the sum of word likelihoods determined along mistakenly utterable candidate paths from a speech waveform of pronunciation by the learner.

7. The foreign language learning method according to claim 5, further comprising the step of evaluating a resultant pronunciation by said learner after practice of the pronunciation, said evaluation made on the basis of each said phoneme and said word in said model sentence uttered by said learner.

8. The foreign language learning method according to claim 7, wherein said step of evaluating a resultant pronunciation after practice thereof includes the step of displaying a vocal tract shape model for each said phoneme via a display unit to said learner.

9. The foreign language learning method according to claim 7, wherein said step of evaluating a resultant pronunciation after practice thereof includes the step of displaying, via a display unit to said learner, a model voice print and a voice print concerning pronunciation by said learner, said voice prints being compared with each other to be displayed.

10. The foreign language learning method according to claim 7, wherein said step of evaluating a resultant pronunciation after practice thereof includes the step of displaying, via a display unit to said learner, position of pronunciation by said learner on a formant plane.

11. A foreign language learning device comprising:

storage means for storing a model sentence to be pronounced by a learner and model phoneme array information including an array of phonemes and word boundaries corresponding to said model sentence;

output means for presenting said model sentence to said learner in advance;

word separation means for receiving sentence speech information corresponding to a sentence pronounced by said learner to separate the sentence speech information into word speech information on the basis of each word included in said sentence;

likelihood determination means for evaluating degree of matching of each said word speech information with a model speech on a likelihood distribution plane; and display output means for displaying, for each phoneme and each said word, a resultant evaluation by said likelihood determination means, said word separation means including phoneme recognition means for recognizing said sentence speech information on the basis of each phoneme information, and word speech recognition means for recognizing said word speech information for each said word according to said phoneme information and said model phoneme array information, and said foreign language learning device further comprising pronunciation evaluation means for evaluating a resultant pronunciation after practice of the pronunciation for each said phoneme and for each said word in said model sentence uttered by said learner in a pronunciation practice period.

12. The foreign language learning device according to claim 11, wherein said pronunciation evaluation means displays a vocal tract shape model for each said phoneme via a display unit to said learner.

13. The foreign language learning device according to claim 11, wherein said pronunciation evaluation means displays, via a display unit to said learner, a model voice print and a voice print concerning pronunciation by said learner, said voice prints being compared with each other to be displayed.

14. The foreign language learning device according to claim 11, wherein said pronunciation evaluation means displays, via a display unit to said learner, position of pronunciation by said learner on a formant plane.

15. A computer-readable medium recorded thereon a program for executing a foreign language learning method by a computer, said foreign language learning method comprising the steps of:

receiving sentence speech information, the sentence speech information corresponding to speech produced successively by a learner when the learner utters a sentence including a plurality of words, and accordingly separating said sentence speech information into word speech information on the basis of each word included in said sentence using model phoneme array information including an array of phonemes and word boundaries of the sentence;

evaluating degree of matching of each said word speech information with a model speech; and displaying, for each said word, a resultant evaluation of each said word speech information.

16. The computer-readable medium according to claim 15, wherein said foreign language learning method further comprising the step of presenting a model sentence to said learner in advance, wherein said step of separating said sentence speech information into said word speech information includes the steps of recognizing said sentence speech information on the basis of each phoneme information, and recognizing said word speech information for each said word according to a model phoneme array information which corresponds to the model sentence presented to said learner and concerns the whole of said model sentence and according to said phoneme information after the separation.

17. The computer-readable medium according to claim 16, wherein said step of recognizing said sentence speech information on the basis of each phoneme information includes the step of determining likelihood of each phoneme information in said sentence speech information, with respect to each of phonemes that can be included in said foreign language, and in said step of evaluating the degree of matching with the model speech, the degree of matching for each said word is evaluated by comparing, on a likelihood distribution plane of phoneme information in said sentence speech information, each word likelihood determined along a path followed when pronunciation follows a phoneme array exactly the same as said model phoneme array information with the sum of word likelihoods determined along mistakenly utterable candidate paths from a speech waveform of pronunciation by the learner.

18. The computer-readable medium according to claim 16, wherein said foreign language learning method further comprises the step of evaluating a resultant pronunciation by said learner after practice of the pronunciation, said evaluation made on the basis of each said phoneme and said word in said model sentence uttered by said learner.

19. The computer-readable medium according to claim 18, wherein said step of evaluating a resultant pronunciation after practice thereof includes the step of displaying a vocal tract shape model for each said phoneme via a display unit to said learner.

20. The computer-readable medium according to claim 18, wherein said step of evaluating a resultant pronunciation after practice thereof includes the step of displaying, via a display unit to said learner, a model voice print and a voice print concerning pronunciation by said learner, said voice prints being compared with each other to be displayed.

21. The computer-readable medium according to claim 18, wherein said step of evaluating a resultant pronunciation after practice thereof includes the step of displaying, via a display unit to said learner, position of pronunciation by said learner on a formant plane.

22. A computer program product including a computer readable medium bearing a computer program for causing a computer to execute a foreign language learning method, said foreign language learning method comprising the steps of:

receiving sentence speech information, the sentence speech information corresponding to speech produced successively by a learner when the learner utters a sentence including a plurality of words, and accordingly separating said sentence speech information into word speech information on the basis of each word included in said sentence using model phoneme array information including an array of phonemes and word boundaries of the sentence;

evaluating degree of matching of each said word speech information with a model speech; and displaying, for each said word, a resultant evaluation of each said word speech information.

* * * * *